(12) United States Patent
Takechi (10) Patent No.: US 8,066,216 B2
(45) Date of Patent: Nov. 29, 2011

(54) DUAL-BEARING REEL LEVER DRAG MECHANISM

(75) Inventor: Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/793,382

(22) Filed: Jun. 3, 2010

(65) Prior Publication Data

US 2011/0011967 A1 Jan. 20, 2011

(30) Foreign Application Priority Data

Jul. 14, 2009 (JP) ................................ 2009-165887

(51) Int. Cl.
*A01K 89/01* (2006.01)

(52) U.S. Cl. ......... 242/246; 242/290; 242/321; 242/322

(58) Field of Classification Search .................. 242/245, 242/246, 265, 290, 291, 302, 321, 322
See application file for complete search history.

(56) References Cited

U.S. PATENT DOCUMENTS

| | | | | |
|---|---|---|---|---|
| 5,297,756 A | * | 3/1994 | Ikuta .............................. | 242/270 |
| 7,097,124 B2 | * | 8/2006 | Ikuta et al. ..................... | 242/322 |
| 7,108,214 B2 | * | 9/2006 | Ikuta et al. ..................... | 242/246 |
| 7,559,499 B2 | * | 7/2009 | Nakagawa et al. ............ | 242/246 |
| 7,753,304 B2 | * | 7/2010 | Ikuta et al. ..................... | 242/310 |
| 7,823,823 B2 | * | 11/2010 | Hirayama ...................... | 242/245 |
| 2005/0253006 A1 | * | 11/2005 | Ikuta et al. ..................... | 242/245 |
| 2005/0253007 A1 | * | 11/2005 | Ikuta et al. ..................... | 242/245 |
| 2006/0016924 A1 | * | 1/2006 | Hirayama et al. ............. | 242/245 |
| 2006/0138267 A1 | * | 6/2006 | Ikuta et al. ..................... | 242/245 |

FOREIGN PATENT DOCUMENTS

JP 2006-246794 A 9/2006

\* cited by examiner

*Primary Examiner* — Emmanu M Marcelo (74) *Attorney, Agent, or Firm* — Global IP Counselors, LLP (57) ABSTRACT

A lever drag mechanism includes a friction disc, a drag disc, and a moving mechanism. The moving mechanism includes an urging member. The urging member urges a bearing by pressing an inner periphery thereof to allow an outer periphery of the bearing to make constant contact with a housing recess. When a drag lever is pivoted, the moving mechanism axially reciprocates the spool shaft to allow a second brake member to make contact with or to separate away from a first brake member.

5 Claims, 6 Drawing Sheets

DUAL-BEARING REEL LEVER DRAG MECHANISM

CROSS-REFERENCE TO RELATED APPLICATIONS

This application claims priority to Japanese Patent Application No. 2009-165887 filed on Jul. 14, 2009, the entirety of which is hereby incorporated by reference.

BACKGROUND

1. Field of the Invention

The present invention generally relates to a lever drag mechanism, more specifically, to a dual-bearing reel lever drag mechanism configured to brake rotation of a dual-bearing spool in a fishing line release direction.

2. Background Information

Dual-bearing reels are generally provided with a drag mechanism. The drag mechanism is configured to prevent a fishing line from being cut by a rapid strong pulling force that is produced in braking a spool rotating in the fishing line release direction. One of the well-known types of the dual-bearing reels is a lever-drag type. Dual-bearing reels of the lever-drag type are provided with a drag mechanism attached onto the periphery of the spool shaft. For example, Japan Laid-open Patent Application Publication No. JP-A-2006-246794 describes a lever-drag type dual-bearing reel. The lever drag mechanism of the dual-bearing reel includes a drag lever, a friction disc, a drag disc, and a moving mechanism. The drag lever is attached onto the spool shaft in a pivotable state. The friction disc is attached and fixed to the right outer surface of the spool (i.e., a side of a reel body for attaching a drag lever thereto). The drag disc is attached onto the spool shaft while being prevented from axially moving and further prevented from rotating in the fishing line release direction of the spool. The drag disc is disposed in the interior of the right section of the reel body. The drag disc is opposed to the friction disc while being allowed to make contact with it. The moving mechanism is configured to reciprocate the spool shaft right and left for causing the drag disc to make contact with or separate from the friction disc in conjunction with pivot of the drag lever. The left section of the reel body of the spool can be compactly formed with the structure that the friction disc is fixed to the right outer surface of the spool. Therefore, the small/middle sized reels, palmed by the hand holding a fishing rod, often adopt this structure.

The moving mechanism with the foregoing configuration includes a pull mechanism and a second spring member. The pull mechanism is configured to pull the spool shaft to the right (i.e., the side of the reel body for attaching the drag lever thereto) in conjunction with clockwise pivot of the drag lever (which produces a drag-effective state) in order to move the friction disc attached to the spool in a direction allowing the friction disc to make contact with the drag disc. The second spring member is configured to move the spool shaft to the left by means of its urging force in conjunction with counterclockwise pivot of the drag lever (which produces a drag-free state). The second spring member with the configuration is disposed for pressing an inner ring of a second bearing to the left side. The second bearing is herein interposed between the right inner peripheral surface of the spool and the outer peripheral surface of the spool shaft. When being pressed to the left side, the inner ring of the second bearing makes contact with a stepped portion of one end of the spool shaft, i.e., a right stepped portion of the spool shaft. The spool shaft is thereby pressed and moved to the left side.

Further, a first bearing is interposed between the left inner peripheral surface of the spool and the outer peripheral surface of the spool shaft. Even further, a first spring member is disposed in a left inner ring of the first bearing. The first spring member is configured to urge the first bearing and the spool to the right. Still further, a stepped portion of the other end of the spool shaft, i.e., a left stepped portion of the spool shaft, is disposed in the right inner ring of the first bearing in a contactable state. When the spool shaft is moved to the left, the first bearing is moved to the left and the first spring member is thereby compressed. The spool is herein configured to be moved right and left unitarily with the spool shaft through the first bearing properly positioned onto the spool shaft by means of a washer.

The well-known lever drag mechanism has a configuration in which the second spring member presses and moves the spool shaft to the left through the inner ring of the second bearing in conjunction with the counterclockwise pivot of the drag lever (which produces the drag-free state). When the spool shaft is moved to the left side, the stepped portion of the other end of the spool shaft presses the inner ring of the first bearing to the left. When the first bearing is thus moved to the left, the first spring member is compressed. In this case, thrust does not act on the spool, but the spool may axially wobble onto the spool shaft. When the spool thus axially wobbles onto the spool shaft, a drag position may be shifted from its initially-set position. This may result in unstable drag force. Further in this case, the spool may move in the course of casting. This may obstruct free-wheeling of the spool.

In view of the above, it will be apparent to those skilled in the art from this disclosure that there exists a need for an improved dual-baring reel lever drag mechanism for stabilizing an initial setting of drag force without worsening free-wheeling of a spool. This invention addresses this need in the art as well as other needs, which will become apparent to those skilled in the art from this disclosure.

SUMMARY

A dual-bearing reel lever drag mechanism according to a first aspect is configured to brake rotation of a spool of a dual-bearing reel in a fishing line release direction. The dual-bearing reel lever drag mechanism includes a lever-shaped drag operation member, a first brake member, a second brake member, and a moving mechanism. The drag operation member is attached around a spool shaft functioning as a rotational axis of the spool in a pivotable state. The lever-shaped drag operation member is disposed on the outside of a reel body. The first brake member is attached to and fixed to an outer surface of the spool. The first brake member is disposed in the interior of a section of the reel body to which the drag operation member is attached. The second brake member is attached onto the spool shaft while being prevented from axially moving and prevented from rotating in the fishing line release direction of the spool. The second brake member is disposed in the interior of the section of the reel body to which the drag operation member is attached. The second brake member is opposed to and contactable with the first brake member. The moving mechanism is configured to reciprocate axially the spool shaft for allowing the second brake member to make contact with and to separate away from the first brake member in conjunction with a pivot of the drag operation member. Further, the spool includes a through hole, a first housing recess, and a second housing recess. The through hole has first and second openings on both lateral sides of the spool. The through hole allows the spool shaft to pass through an inner periphery thereof. The first housing recess contains a first bearing to support the spool shaft. The first housing recess is formed around the first opening. The first housing recess has a diameter greater than a diameter of the first opening. The first opening is formed in one side of the spool to which the first brake member is not attached. The second housing recess contains a second bearing to support the spool shaft. The second housing recess is formed around the second opening. The second housing recess has a diameter greater than a diameter of the second opening. The second opening is formed in the side of the spool opposite the side to which the first brake member is attached. Further, the moving mechanism includes a second urging member configured to urge the second bearing by pressing an inner periphery of the second bearing for allowing an outer periphery of the second bearing to make constant contact with the second housing recess.

The dual-bearing reel lever drag mechanism of the first aspect is provided with the second urging member configured to urge the second bearing by pressing the inner periphery of the second bearing to allow the outer periphery of the second bearing to make constant contact with the second housing recess of the spool. When the drag operation member is herein pivoted in the direction to produce the drag-free state, urging force of the second urging member moves the spool to the left through the second bearing. When the spool is moved to the left, the first bearing, contained in the first housing recess of the spool, abuts the first housing recess. Axial wobbling of the spool shaft can be thereby prevented. In other words, the spool is prevented from axially wobbling onto the spool shaft. Further, according to a dual-bearing reel lever drag mechanism of the first aspect, the spool can be prevented from axially wobbling onto the spool shaft in the drag-free state. The initial position, i.e., the preset position, of the drag force is thereby fixed and stable drag force can be produced. Simultaneously, the spool is prevented from moving in the course of casting because axial wobbling of the spool can be inhibited in the drag-free state. Therefore, free-wheeling of the spool is prevented from deteriorating.

A dual-bearing reel lever drag mechanism according to a second aspect relates to the dual-bearing reel lever drag mechanism according to the first aspect, wherein the moving mechanism includes a first urging member. The first urging member urges the first bearing by pressing an inner periphery of the first bearing to allow an outer periphery of the first bearing to make constant contact with the first housing recess. According to the dual-bearing reel lever drag mechanism, axial wobbling of the spool can be prevented by the structure in which the first urging member urges the first bearing to allow it to make constant contact with the first housing recess.

Further, according to the dual-bearing reel lever drag mechanism, axial wobbling of the first bearing and the first urging member can be inhibited by this structure in which the first urging member urges the first bearing to allow it to make constant contact with the first housing recess. Even further, according to this dual-bearing reel lever drag mechanism, drag force effectively acts on the spool shaft because axial pressure constantly acts on the first bearing. Accordingly, high casting performance of the spool can be realized.

A dual-bearing reel lever drag mechanism according to a third aspect relates to the dual-bearing reel lever drag mechanism according to the second aspect, wherein the first urging member is a disc spring. According to the dual-bearing lever drag mechanism, a strong urging force can be obtained with a simple component, i.e., the disc spring functioning as the first urging member.

A dual-bearing reel lever drag mechanism according to a fourth aspect relates to the dual-bearing reel lever drag mechanism according to one of the first to third aspects, wherein the second urging member is a coil spring. According to the dual-bearing reel lever drag mechanism, urging force can be obtained with a cheap component, i.e., the coil spring functioning as the second urging member.

A dual-bearing reel lever drag mechanism according to a fifth aspect relates to the dual-bearing reel lever drag mechanism according to one of the first to fourth aspects, wherein each of the first and second bearings includes an inner ring, an outer ring, and rolling elements. The inner ring supports the spool shaft through the inner periphery thereof. The outer ring is supported by the first/second housing recess through the outer periphery thereof. The rolling elements are interposed between the inner ring and the outer ring. According to this dual-bearing reel lever drag mechanism, it is possible to maintain high rotational performance of the spool with respect to the spool shaft by using, for instance, a ball bearing provided with steel balls as the rolling elements.

The dual-bearing reel lever drag mechanism is provided with the second urging member configured to urge the second bearing by pressing the inner periphery of the second bearing to allow the outer periphery of the second bearing to make constant contact with the second housing recess of the spool. Therefore, the initial setting of the drag force can be stabilized without having an adverse effect on the free-wheeling of the spool.

These and other objects, features, aspects, and advantages of the present invention will become apparent to those skilled in the art from the following detailed description, which, taken in conjunction with the annexed drawings, discloses exemplary embodiments.

BRIEF DESCRIPTION OF THE DRAWINGS

Referring now to the attached drawings which form a part of this original disclosure.

DETAILED DESCRIPTION OF THE EXEMPLARY EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
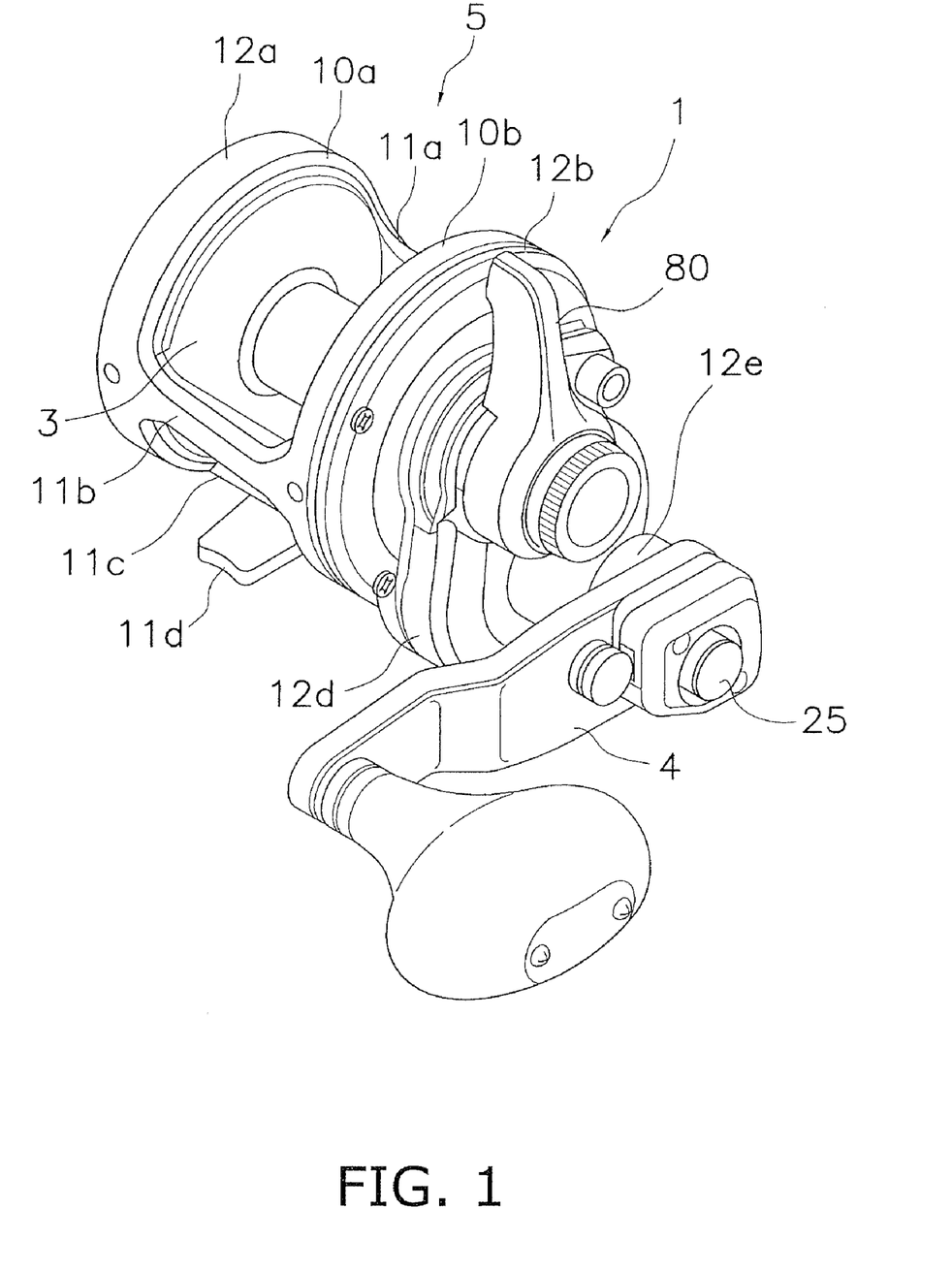
FIG. 1 is a perspective view of a dual-bearing reel according to an exemplary embodiment.
Figure 2:
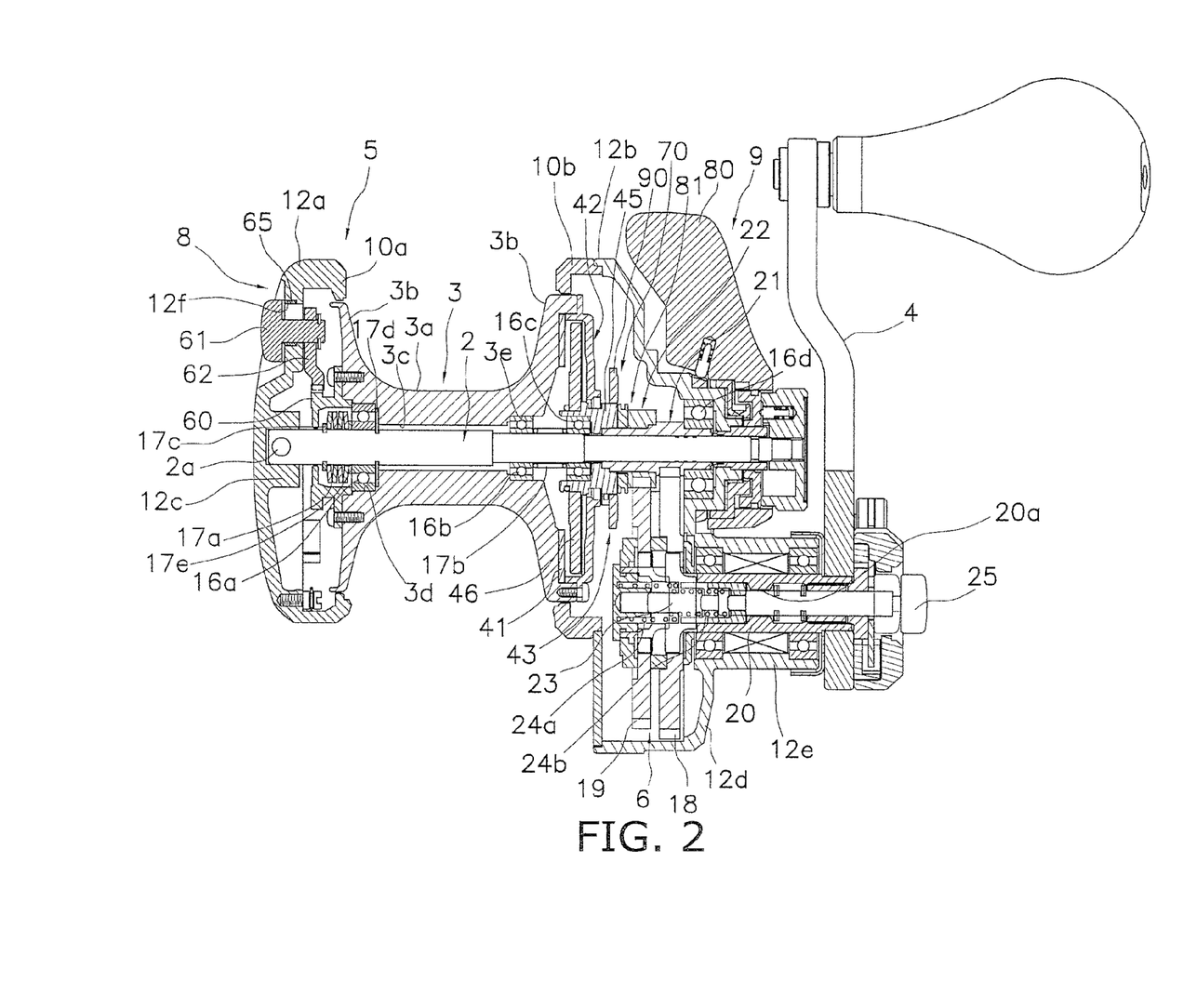
FIG. 2 is a cross-sectional view of the dual-bearing reel.

As illustrated in FIGS. 1 and 2, a dual-bearing reel according to an exemplary embodiment is a medium-sized lever drag reel. The lever drag reel includes a tubular reel body 1, a spool shaft 2, a spool 3, and a handle 4. The spool shaft 2 is attached to the center part of the reel body 1 while being prevented from rotating and allowed to move axially. The spool 3 is supported by the spool shaft 2 while being allowed to rotate and being prevented from axially movement relative to the spool shaft 2. The handle 4 is disposed lateral to the reel body 1. As illustrated in FIG. 2, the lever drag reel further includes a rotation transmission mechanism 6, a lever drag mechanism 9, and an anti-reverse mechanism 70 in the interior of the reel body 1. The rotation transmission mechanism 6 is configured to deliver rotation of the handle 4 to the spool 3. The lever drag mechanism 9 is configured to brake rotation of the spool 3 in a fishing line release direction. The anti-reverse mechanism 70 is configured to prevent rotation of a drag disc 42 in the fishing line release direction.

As illustrated in FIGS. 1 and 2, the reel body 1 includes a metal frame 5 composed of a pair of a first side plate 10a and a second side plate 10b, coupling portions 11a, 11b, and 11c, and a first cover member 12a. The first and second side plates 10a and 10b are a pair of right and left saucer-shaped metal plates. The coupling portions 11a, 11b, and 11c couple the first side plate 10a and the second side plate 10b at the front, the rear, and the bottom of the frame 5. The first cover member 12a is integrally formed with the first side plate 10a for covering the outside of the first side plate 10a. As illustrated in FIG. 2, the first cover member 12a includes an elongated aperture 12f in an upper right portion of its lateral part, seen from the left side of FIG. 2.

Referring to FIGS. 1 and 2, the coupling portion 11c of the frame 5 includes a fishing-rod attachment portion 11d for attaching the lever drag reel to a fishing rod. The fishing-rod attachment portion 11d is integrally formed with the coupling portion 11c. The first and second side plates 10a and 10b, the coupling portions 11a, 11b, and 11c, and the first cover member 12a are integrally formed by metal cutting work, and can form a one piece unitary member.

As illustrated in FIG. 1, the reel body 1 includes a second cover member 12b made of metal. The second cover member 12b covers the outside of the second side plate 10b. Further, each of the first and second side plates 10a and 10b includes an opening for allowing the spool 3 to pass through. The first cover member 12a includes a boss portion 12c in its interior. The boss portion 12c supports the left distal end of the spool shaft 2 while preventing the spool shaft 2 from rotating and allowing it to move axially. As illustrated in FIG. 2, the first cover member 12a contains a spool sound producing mechanism 8 in its interior. The spool sound producing mechanism 8 is configured to produce sound in conjunction with rotation of the spool 3.

As illustrated in FIG. 2, the spool sound producing mechanism 8 is configured to produce sound in conjunction with rotation of the spool 3. Further, the spool sound producing mechanism 8 can be switched between a sound activation state for allowing the spool producing mechanism 8 to produce sound and a sound deactivation state for preventing the spool sound producing mechanism 8 from producing sound. As illustrated in FIG. 2, the spool sound producing mechanism 8 includes a convexo-concave member 60, an operation member 61, a sound producing member 62, an urging member (not illustrated in the figure), and a collar member 65. The convexo-concave member 60 is configured to rotate in conjunction with rotation of the spool 3. The operation member 61 is attached to the convexo-concave member 60 while being movable in both a direction away from the convexo-concave member 60 and a direction close to the convexo-concave member 60. The sound producing member 62 is attached to the operation member 61 in a pivotable state. The urging member urges the sound producing member 62 towards the convexo-concave member 60. The collar member 65 is an elastic member attached to the elongated aperture 12f of the first cover member 12a for positioning the operation member 61 in either the sound activation position or the sound deactivation position.

As illustrated in FIGS. 1 and 2, the second cover member 12b, disposed on the same side as the handle 4, has a bulged portion 12d. The bulged portion 12d protrudes in both a radial direction and an axial outward direction. As illustrated in FIG. 2, the bulged portion 12d contains the rotation transmission mechanism 6 in its interior. Further, the second cover member 12b has a support tubular portion 12e in the lower part of the bulged portion 12d. The support tubular portion 12e protrudes in an axial outward direction, and supports a handle shaft 20 of the handle 4.

As illustrated in FIG. 2, the spool shaft 2 is supported by the boss portion 12c of the first cover member 12a and the second cover member 12b while being prevented from rotating and allowed to move axially. The spool shaft 2 is provided with an anti-rotation pin 2a. Specifically, the anti-rotation pin 2a is attached to the left distal end of the spool shaft 2 while passing through the spool shaft 2 in a radial direction. On the other hand, the boss portion 12c of the first cover member 12a has an anti-rotation slit (not illustrated in the figure) that engages with the anti-rotation pin 2a. The anti-rotation slit is formed along a radial direction of the boss portion 12c.

Figure 3:
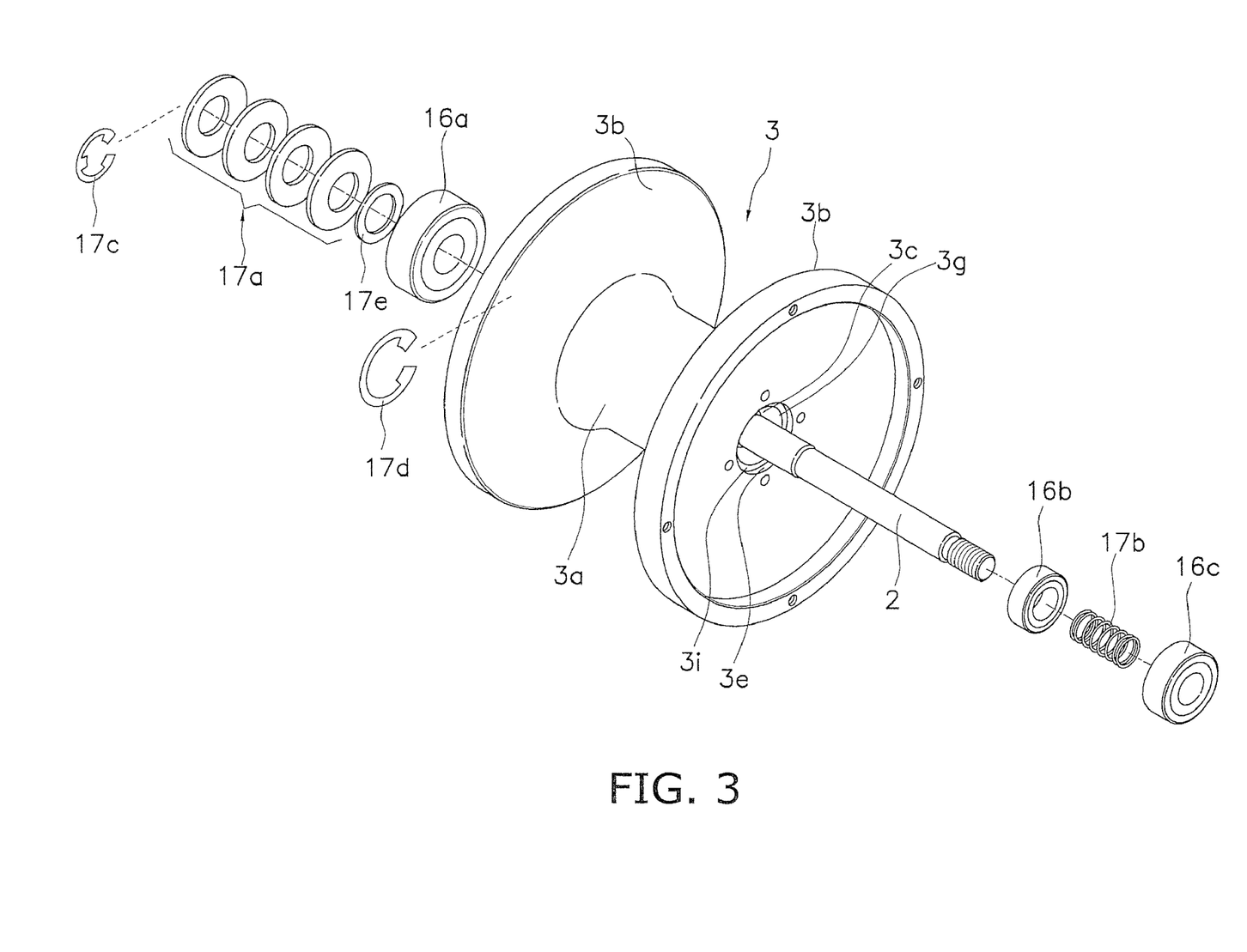
FIG. 3 is an exploded perspective view of a spool of the dual-bearing reel and its periphery.
Figure 4:
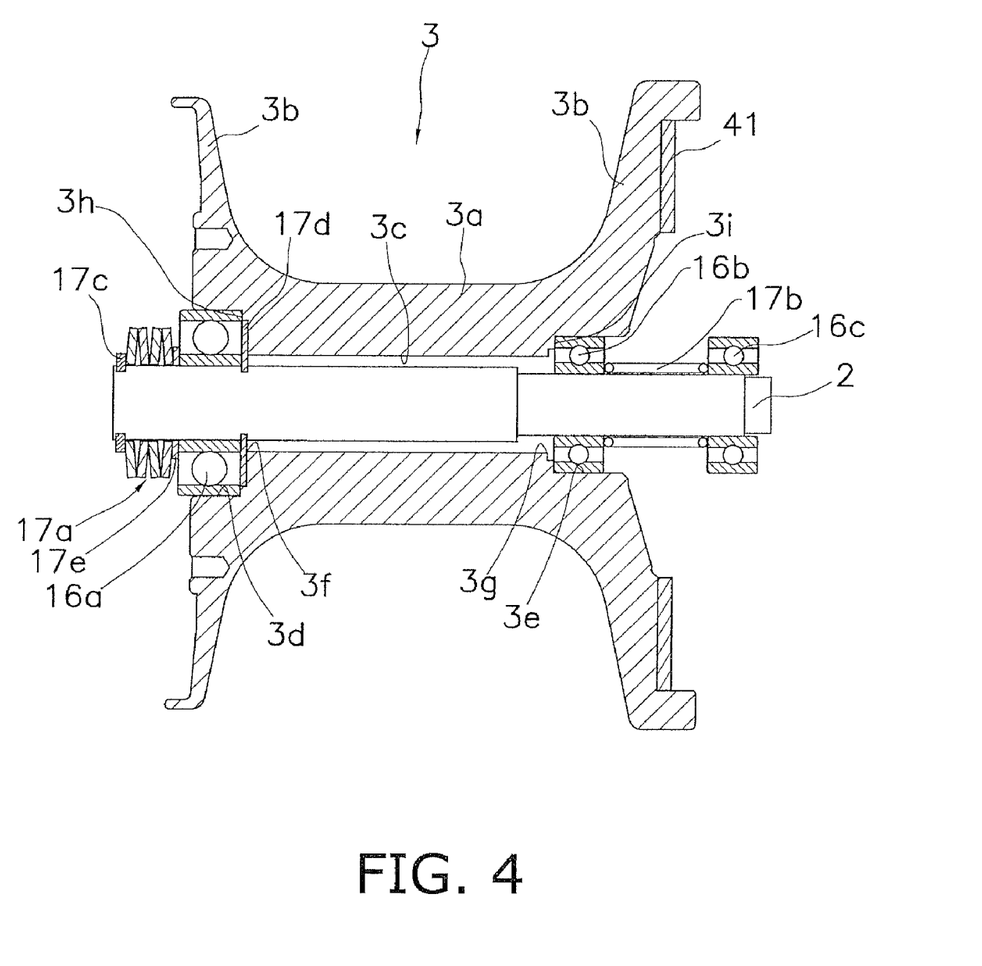
FIG. 4 is a cross-sectional view of the spool and its periphery.

As illustrated in FIGS. 2 to 4, the spool shaft 2 supports the spool 3 in a rotatable state through first and second bearings 16a and 16b disposed on the outer periphery of the spool shaft 2. The first bearing 16a is urged in an axial inward direction (i.e., rightward in FIG. 2) by a first spring member 17a, which is a disc-spring type. On the other hand, the second bearing 16b is urged in an axial inward direction (i.e., leftward in FIG. 2) by a second spring member 17b of a coil-spring type. As illustrated in FIGS. 3 and 4, the first spring member 17a is composed of two pairs of opposed disc springs (i.e., four disc springs). A washer 17e is axially disposed between an end of the first spring member 17a and the first bearing 16a. The first spring member 17a or the first spring member 17a and the washer 17e can be considered to be an urging member. One end of the first spring member 17a makes contact with a first washer 17c attached onto the spool shaft 2, whereas the other end of the first spring member 17a contacts the washer 17e, which contacts an inner ring of the first bearing 16a. The first spring member 17a is configured to press the first bearing 16a to allow the first bearing 16a to make constant contact with a first housing recess 3d of the spool 3 described below. Further, a second washer 17d is attached onto the spool shaft 2 while being axially interposed between the first bearing 16a and the first housing recess 3d of the spool 3. As illustrated in FIGS. 2 to 4, the second spring member 17b is interposed between the second bearing 16b and a third bearing 16c. The second spring member 17b presses an inner ring of the second bearing 16b to allow the outer periphery of the second bearing 16b to make constant contact with a second housing recess 3e of the spool 3 described below. Note the first and second spring members 17a and 17b form a moving mechanism 43 of the lever drag mechanism 9 described below. Further, the axial inner surfaces of the first and second bearings 16a and 16b are prevented from moving inward by the spool 3 and the spool shaft 2. Therefore, the spool shaft 2 and the spool 3 are allowed to move unitarily in the axial direction. Specifically, the spool shaft 2 is moved together with the spool 3 in the axial direction by the lever drag mechanism 9.

As illustrated in FIGS. 2 to 4, the spool 3 includes a bobbin trunk 3a and a pair of flanges 3b integrally formed on both edges of the bobbin trunk 3a. In addition, a friction disc 41 is fixed to the end surface of the right-side flange 3b by a screw. The friction disc 41 forms a part of the lever drag mechanism 9. The bobbin trunk 3a includes a through hole 3c axially passing through its inner periphery. The through hole 3c allows the spool shaft 2 to be inserted through its interior.

Figure 5:
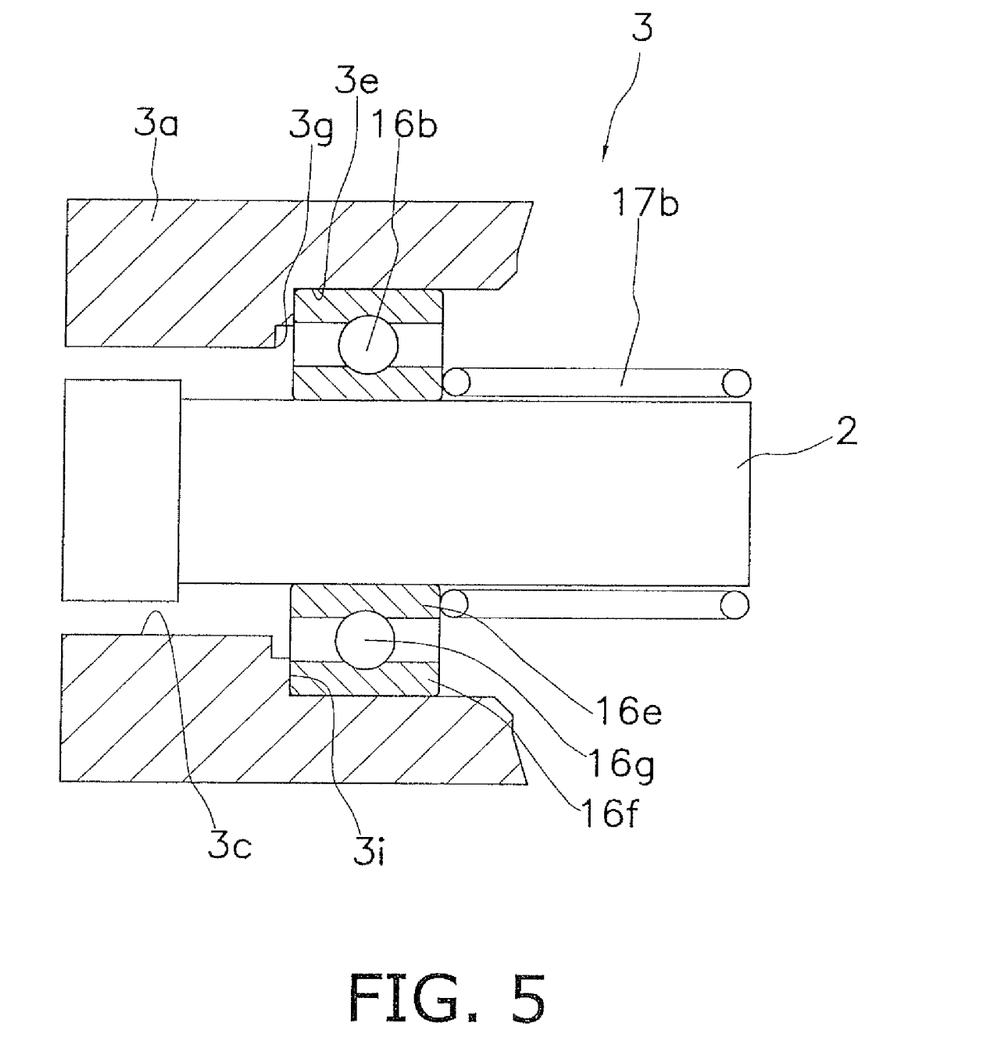
FIG. 5 is an enlarged cross-sectional view of a bearing of the spool and its periphery.

As illustrated in FIGS. 3 and 4, the spool 3 includes the first housing recess 3d and the second housing recess 3e. The first housing recess 3d is formed on the same side as a first opening 3f of the through hole 3c, and is recessed toward the center of the spool 3. In other words, the first housing recess 3d is formed on a side of the spool 3 where the friction disc 41 is not attached (i.e, a left side in FIG. 4). The first housing recess 3d has diameter greater than that of the first opening 3f. The first housing recess 3d contains the first bearing 16a supporting the spool shaft 2. On the other hand, the second housing recess 3e is formed on the same side as a second opening 3g of the through hole 3c, and is recessed toward the center of the spool 3. In other words, the second housing recess 3e is formed on a side of the spool 3 where the friction disc 41 is attached (i.e., a right side in FIG. 4). The second housing recess 3e has diameter greater than the second opening 3g. The second housing recess 3e contains the second bearing 16b supporting the spool shaft 2. As illustrated in FIG. 4, the first housing recess 3d is a recess having diameter greater than that of the first opening 3f of the through hole 3c. The first housing recess 3d contains the first bearing 16a while allowing both the outer peripheral surface and the lateral surface (i.e., the right side in FIG. 4) of the first bearing 16a to make contact therewith through the second washer 17d. The outer peripheral surface extends parallel or substantially parallel to the through hole 3c. The lateral surface extends perpendicular or substantially perpendicular to the outer peripheral surface. Further, the first housing recess 3d includes a first stepped portion 3h. The first stepped portion has a lateral portion that extends from the outer peripheral surface parallel or substantially parallel to the lateral surface. The first stepped portion also has an inner peripheral portion that extends from the inner periphery of the lateral portion from the lateral surface parallel or substantially parallel to the outer peripheral surface. The first stepped portion 3h allows an outer ring 16f (described below) of the first bearing 16a to make contact therewith when the first bearing 16a is pressed to the right. As illustrated in FIGS. 4 and 5, on the other hand, the second housing recess 3e is a recess having diameter greater than that of the second opening 3g of the through hole 3c. The second housing recess 3e contains the second bearing 16b while allowing the outer peripheral surface and the lateral surface (i.e., the left side in FIG. 4) of the second bearing 16b to make contact therewith. Further, the second housing recess 3e includes a second stepped portion 3i. The second stepped portion 3i has an inner peripheral portion that extends from the lateral surface of the second housing recess 3e to the center of the spool parallel or substantially parallel to the outer peripheral surface of the second housing recess 3e. The second stepped portion 3i also has a lateral portion that extends from an end of the inner peripheral portion opposite the lateral surface of the second housing recess 3e to the second opening parallel or substantially parallel to the lateral surface of the second housing recess 3e. The second stepped portion 3i allows an outer ring 16f (described below) of the second bearing 16b to make contact therewith when the second bearing 16b is pressed to the left. The first and second bearings 16a and 16b are both ball bearings. Note FIG. 5 illustrates only structure of the second bearing 16b but structure of the second bearing 16b is the same as that of or similar to the first bearing 16a although their respective sizes do not have the be the same. As illustrated in FIG. 5, the second bearing 16b is composed of an inner ring 16e, the outer ring 16f, and rolling elements 16g. The inner ring 16e supports the spool shaft 2 through its inner periphery. The outer ring 16f is supported through its outer periphery by the second housing recess 3e (the first housing recess 3d in the case of the first bearing 16a). The rolling elements 16g are steel balls interposed between the inner ring 16e and the outer ring 16f.

As illustrated in FIG. 2, the handle 4 is secured to the protruded end of the tubular handle shaft 20 disposed below and in parallel to the spool shaft 2. The handle shaft 20 is supported by the reel body 1 in a rotatable state.

As illustrated in FIG. 2, the rotation transmission mechanism 6 includes a speed-change mechanism configured to switch handle rotation between a high-speed level and a low-speed level. As illustrated in FIG. 2, the rotation transmission mechanism 6 includes a first main gear 18, a second main gear 19, a first pinion gear 21, a second pinion gear 22, an engaging piece 23, a first compression spring 24a, a second compression spring 24b, and an operation shaft 25. The first main gear 18 and the second main gear 19 are respectively supported by the handle shaft 20 of the handle 4 in a rotatable state. The first main gear 18 is used for winding the fishing line at high speed, whereas the second main gear 19 is used for winding the fishing line at low speed. The first pinion gear 21 and the second pinion gear 22 are respectively attached to the spool shaft 2 in a rotatable state. Simultaneously, the first pinion gear 21 is meshed with the first main gear 18, whereas the second pinion gear 22 is meshed with the second main gear 19. The engaging piece 23 couples either the first main gear 18 or the second main gear 19 to the handle shaft 20. Accordingly, handle rotation is delivered to the coupled one of the first main gear 18 and the second main gear 19 via the handle shaft 20. The first compression spring 24a (an example of an operation shaft urging member) is disposed on the left side of the engaging piece 23 in FIG. 2. The first compression spring 24a urges the operation shaft 25 in an axial outward direction (i.e., rightward in FIG. 2) through the engaging piece 23 and the second compression spring 24b. The second compression spring 24b is disposed on the right side of the engaging piece 23 in FIG. 2. The second compression spring 24b urges the engaging piece 23 towards the second main gear 19. The operation shaft 25 sets the engaging piece 23 to be in either a high-speed position or a low-speed position. The engaging piece 23 is engaged with the first main gear 18 in the high-speed position, whereas the engaging piece 23 is engaged with the second main gear 19 in the low-speed position. In FIG. 2, the engaging piece 23 set to be in the high-speed position is depicted with a solid line, whereas the engaging piece 23 set to be in the low-speed position is depicted with a dashed two-dotted line.

As illustrated in FIG. 2, the first pinion gear 21 is a tubular member. The first pinion gear 21 is made of anti-corrosive metal (e.g., non-magnetic stainless alloy). The right end of the first pinion gear 21 is supported by a fourth bearing 16d in a rotatable state. The fourth bearing 16d is attached to the bulged portion 12d while being disposed about the spool shaft 2. On the other hand, the left end of the first pinion gear 21 is engaged with the drag disc 42 of the lever drag mechanism 9 while being unitarily rotatable with it. The second pinion gear 22 is a tubular member made of the same material as the first pinion gear 21. The left end of the second pinion gear 22 is engaged with the drag disc 42 while being unitarily rotatable with it. The engaging piece 23 is disposed within a slit of the handle shaft 20 in a non-rotatable state. As illustrated in FIG. 2, the operation shaft 25 is inserted through the through hole 20a of the handle shaft 20. In FIG. 2, the right end of the operation shaft 25 protrudes in an axial outward direction of the handle 4 (i.e., rightward in FIG. 2). The operation shaft 25 can be thereby pressed leftward in FIG. 2.

According to the rotation transmission mechanism 6 with the foregoing structure, the engaging piece 23 is engaged with the second main gear 19 when the operation shaft 25 is pushed leftward in FIG. 2 by a press operation of the operation shaft 25. Under this condition, rotation of the handle 4 is delivered to the second pinion gear 22 through the second main gear 19. The spool 3 is accordingly rotated at low speed. On the other hand, the engaging piece 23 is engaged with the first main gear 18 when the operation shaft 25 is pulled rightward in FIG. 2. Under this condition, rotation of the handle 4 is delivered to the first pinion gear 21 through the first main gear 18. The spool 3 is accordingly rotated at high speed.

As illustrated in FIG. 2, the lever drag mechanism 9 includes the friction disc 41, the drag disc 42, and the moving mechanism 43. The friction disc 41 is attached to the right end of the spool 3 in FIG. 2. The drag disc 42 is opposed to the friction disc 41. The moving mechanism 43 is configured to reciprocate axially the spool shaft 2.

As illustrated in FIG. 2, the friction disc 41 is a disc washer member made of abrasion-resistant material (e.g., carbon graphite, fiber reinforced resin, etc.). The friction disc 41 is fixed to the outer surface of the right-side flange 3b of the spool 3 by plural attachment bolts. The attachment bolts are herein circumferentially arranged at predetermined intervals.

As illustrated in FIG. 2, the drag disc 42 includes a disc body 45 and a brake disc 46. The disc body 45 is engaged with the first pinion gear 21 and the second pinion gear 22 while being unitarily rotatable with them. The brake disc 46 is fixed to the disc body 45 by plural attachment bolts while being opposed to the friction disc 41. The brake disc 46 is made of for instance, stainless steel. Again, the disc body 45 is a disc member produced by aluminum die casting. The disc body 45 is supported by the spool shaft 2 through the third bearing 16c in a rotatable state. The brake disc 46 is fixed to the surface of the disc body 45 opposed to the spool 3.

As illustrated in FIG. 2, the moving mechanism 43 includes a drag lever 80 (lever-shaped drag operation member) and a pull mechanism 81. The drag lever 80 is attached to the reel body 1 in a pivotable state. More specifically, the drag lever 80 is attached to pivot around the spool shaft 2, with the spool shaft 2 being its axis of rotation. The pull mechanism 81 is configured to pull and to move the spool shaft 2 rightward in FIG. 2 in response to a clockwise pivot of the drag lever 80 in FIG. 1. As illustrated in FIGS. 2 to 4, the moving mechanism 43 includes the first spring member 17a and the second spring member 17b. The first spring member 17a presses the inner ring 16e of the first bearing 16a to allow the outer ring 16f of the first bearing 16a to make constant contact with the first housing recess 3d. On the other hand, the second spring member 17b presses the inner ring 16e of the second bearing 16b for allowing the outer ring 16f of the second bearing 16b to make constant contact with the second housing recess 3e. In this case, when the drag lever 80 is pivoted in the counterclockwise direction of FIG. 1 (i.e., a direction for producing the drag-free state), the second bearing 16b presses the second housing recess 3e of the spool 3 to the left by an urging force of the second spring member 17b. The spool 3 is thereby moved to the left. Simultaneously, the first bearing 16a is pressed to the right by an urging force of the first spring member 17a. The first bearing 16a thereby abuts to the first housing recess 3d of the spool 3.

The drag lever 80 is pivoted for adjusting the magnitude of drag force of the lever drag mechanism 9 in the lever drag reel with the foregoing structure. When the drag lever 80 is set in a drag release position (i.e., the outermost pivot position in the counterclockwise direction in FIG. 1), the friction disc 41 is separated from the drag disc 42 in the lever drag mechanism 9. A drag release state is thus produced, and the spool 3 is set to be in a freely rotatable state. Casting can be performed under the condition. When the drag lever 80 is pivoted in the clockwise direction in FIG. 1, the friction disc 41 is gradually moved in the axial outward direction of the spool shaft 2 (i.e., rightward in FIG. 2), and the spool shaft 2 and spool 3 are gradually moved rightward. Consequently, the friction disc 41 strongly presses the drag disc 42, and drag force is thus increased.

Figure 6:
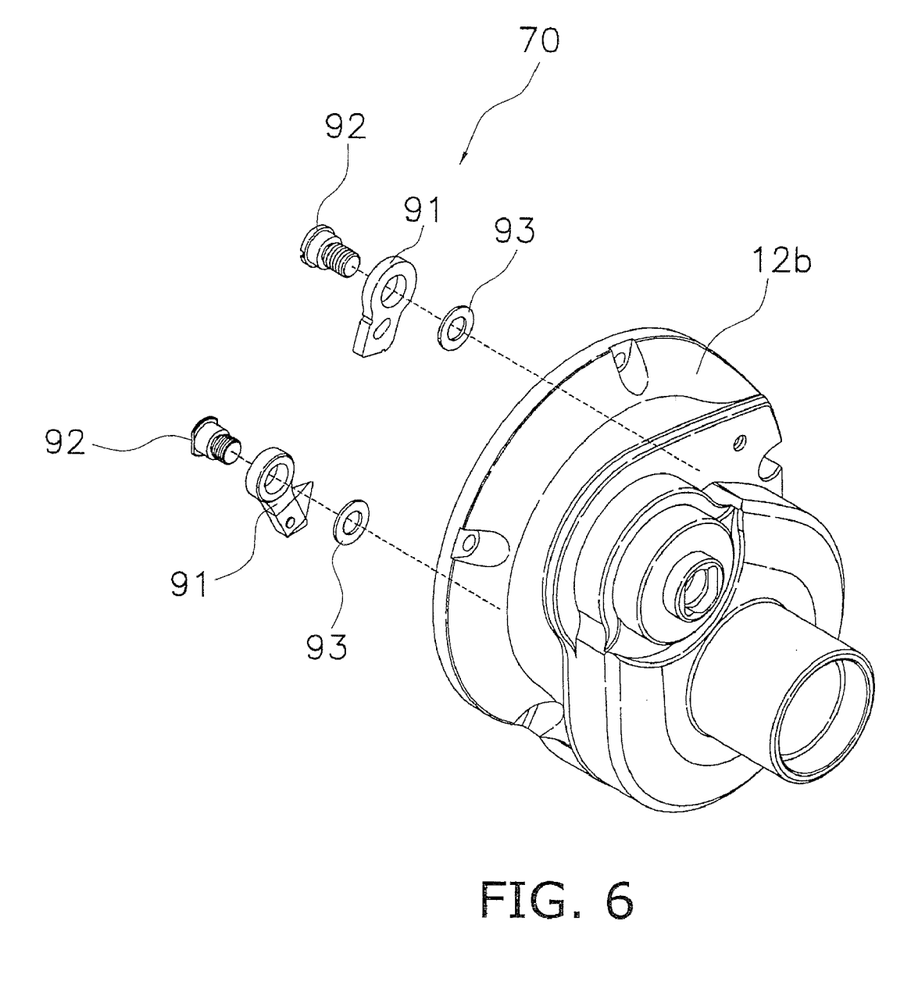
FIG. 6 is an exploded perspective view of an anti-reverse mechanism of the dual-bearing reel and its periphery.

As illustrated in FIGS. 2 and 6, the anti-reverse mechanism 70 is a pawl-type one-way clutch. The anti-reverse mechanism 70 includes a rotation member 90, a pawl member 91, and an urging member (not illustrated in the figure). The rotation member 90 includes a convexo-concave portion on its outer periphery. The pawl member 91 is configured to be engaged with the convexo-concave portion of the rotation member 90. The urging member is configured to urge the pawl member 91 towards the convexo-concave portion of the rotation member 90.

As illustrated in FIG. 6, the pawl member 91 is formed by blanking/punching stainless-alloy thin plates by press working. In the present exemplary embodiment, the pawl member 91 is formed by two sheets of plate members having the identical thicknesses. The pawl member 91 is coupled to the second cover member 12b made of aluminum alloy by a bolt-shaped pin member 92 while being pivotable between an engagement position and a separation position. In the engagement position, the pawl member 91 is engaged with the convexo-concave portion of the rotation member 90 to prevent reverse rotation of the drag disc 42. In the separation position, on the other hand, the pawl member 91 is separated from the convexo-concave portion of the rotation member 90. As illustrated in FIG. 6, a washer 93, made of insulating resin, is interposed between the pawl member 91 and the second cover member 12b. Specifically, the washer 93 is a washer made of insulating resin such as polyamide resin. Therefore, the washer 93 can prevent galvanic corrosion of the pawl member 91 made of stainless alloy and/or the second cover member 12b made of aluminum alloy while being interposed between the members.

The lever drag mechanism 9 with the foregoing structure includes the second spring member 17b configured to urge the second bearing 16b by pressing the inner ring 16e of the second bearing 16b for allowing the outer ring 16f of the second bearing 16b to make constant contact with the second housing recess 3e of the spool 3. When the drag lever 80 is herein pivoted in a direction for producing the drag-free state, the urging force of the second spring member 17b moves the spool 3 to the left through the second bearing 16b. When the spool 3 is moved to the left, the first bearing 16a, contained in the first housing recess 3d of the spool 3, abuts the first housing recess 3d. The structure prevents axial wobbling of the spool 3. Specifically, the spool 3 is prevented from axially wobbling about the spool shaft 2. According to the present exemplary embodiment, the spool 3 can be thus prevented from axially wobbling about the spool shaft 2 in the drag-free state. The initial position (i.e., the preset position) of drag force is thereby fixed, and stable drag force can be produced. Further, the spool 3 is prevented from moving in the course of casting because axial wobbling of the spool 3 can be inhibited in the drag-free state. Therefore, free-wheeling of the spool 3 can be prevented from deteriorating.

Further, when the drag lever 80 is pivoted in the direction for producing the drag-free state in the present exemplary embodiment, urging force of the second spring member 17b moves the spool 3 to the left through the second bearing 16b. When the spool 3 is moved to the left, the first bearing 16a, contained in the first housing recess 3d of the spool 3, is abutted to the first housing recess 3d. Therefore, axial wobbling of the first bearing 16a can be prevented. Yet further, in the present exemplary embodiment, the second spring member 17b causes the second bearing 16b to press constantly the spool 3 to the left regardless of which state is produced, either the drag-effective state or the drag-free state, without making the second bearing 16b press the spool shaft 2 to the left as configured in the well-known lever drag mechanisms. Therefore, axial wobbling of the first bearing 16a can be reliably inhibited, especially, even when the drag-free state is produced. Still further, in the present exemplary embodiment, the first spring member 17a presses the first bearing 16a for allowing it to make constant contact with the first housing recess 3d. Therefore, axial wobbling of the first bearing 16a and the first spring member 17a can be prevented.

Other Exemplary Embodiments (a) The foregoing exemplary embodiment has exemplified the medium-sized lever drag reel. However, the present invention is not limited to this. For example, the present invention is applicable to the large-sized dual-bearing reels.

(b) In the foregoing exemplary embodiment, the first spring member 17a is a spring member of a disc-spring type whereas the second spring member 17b is a spring member of a coil-spring type. However, the shapes of the urging members are not limited to them.

(c) In the foregoing exemplary embodiment, the second washer 17d is interposed between the first bearing 16a and the first housing recess 3d of the spool 3. However, the washer 17d may not be necessarily provided therein.

(d) In the foregoing exemplary embodiment, the first and second bearings 16a and 16b are ball bearings. However, the structures of the bearings are not limited to the ball bearings.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a reel. Accordingly, these terms, as utilized to describe the present invention should be interpreted relative to a reel as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel lever drag mechanism configured to brake rotation of a spool having axially opposite first and second sides of a dual-bearing reel in a fishing line release direction, comprising:

a lever-shaped drag operation member pivotably attached to a second side section of the reel body on the second side of the spool, the lever-shaped drag operation member being attached around a spool shaft extending along a rotational axis of the spool and the lever-shaped drag operation member, the lever-shaped drag operation member being disposed on the outside of the reel body;

a first brake member attached to and fixed to an outer surface of the spool on the second side of the spool, the first brake member disposed in the interior of the second side section of the reel body;

a second brake member attached onto the spool shaft while being prevented from axially moving relative to the reel body and prevented from rotating in the fishing line release direction of the spool, the second brake member disposed in the interior of the second side section of the reel body, the second brake member opposed to and contactable with the first brake member; and a moving mechanism configured to reciprocate axially the spool shaft to allow the second brake member to make contact with and to separate away from the first brake member in conjunction with a pivot of the drag operation member, the spool including first and second bearings, a through hole having first and second openings respectively formed on the first and second sides of the spool, the spool shaft passing through an inner periphery of the through hole, a first housing recess formed contiguous with the first opening, the first housing recess having a diameter greater than a diameter of the first opening, and a second housing recess formed contiguous with the second opening, the second housing recess having a diameter greater than a diameter of the second opening, the first bearing being arranged in the first housing recess to support the spool shaft, the second bearing being arranged in the second housing recess to support the spool shaft, and the moving mechanism including a second side urging member urging the second bearing by pressing an inner-side surface of the second bearing to allow an outer-side surface of the second bearing to be always in contact with the second housing recess, the outer-side surface of the second bearing is a first side surface thereof which is parallel to a radial direction of the second bearing, the inner-side surface of the second bearing is a second side surface thereof being parallel to the radial direction.

2. The dual-bearing reel lever drag mechanism according to claim 1, wherein the moving mechanism includes a first side urging member that urges the first bearing by pressing an inner-side surface of the first bearing to allow an outer-side surface of the first bearing to make constant contact with the first housing recess.

3. The dual-bearing reel lever drag mechanism according to claim 2, wherein the first side urging member is a disc spring.

4. The dual-bearing reel lever drag mechanism according to claim 1, wherein the second side urging member is a coil spring.

5. The dual-bearing reel lever drag mechanism according to claim 1, wherein
   each of the first and second bearings includes
      an inner ring supporting the spool shaft through an inner periphery of the inner ring,
      an outer ring supported by the first or second housing recess through an outer periphery of the first or second housing recess, and
      rolling elements interposed between the inner ring and the outer ring.

* * * * *